March 10, 1970 R. W. KEARNS 3,500,159
ELECTRONIC CONTROL FOR WINDSHIELD WIPERS
Original Filed Dec. 1, 1964
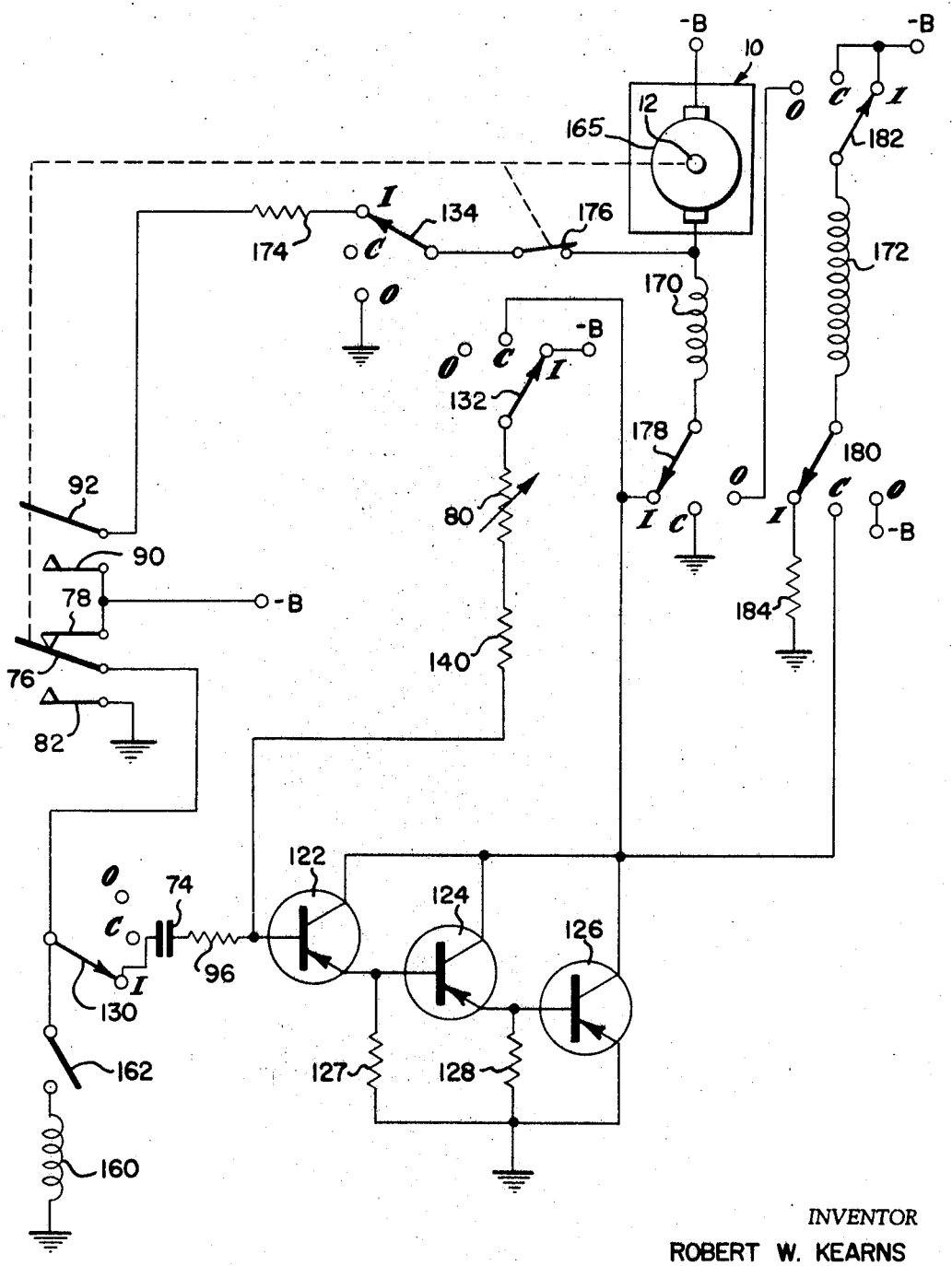
INVENTOR
ROBERT W. KEARNS
BY Lane, Aitken, Dunner & Ziems
ATTORNEYS

United States Patent Office 3,500,159
Patented Mar. 10, 1970

1

3,500,159
ELECTRONIC CONTROL FOR WINDSHIELD WIPERS
Robert W. Kearns, Detroit, Mich., assignor, by mesne assignments, to Tann Company, Detroit, Mich., a partnership of Michigan
Original application Dec. 1, 1964, Ser. No. 414,973, now Patent No. 3,351,836, dated Nov. 7, 1967. Divided and this application Sept. 1, 1967, Ser. No. 665,103
Int. Cl. H02p 3/16, 1/18
U.S. Cl. 318—247    6 Claims

ABSTRACT OF THE DISCLOSURE

A transistorized electronic circuit for controlling a wiper motor of a windshield cleaning system in a manner to provide three modes of operation, an intermittent mode with dwell periods at the end of each wiping cycle, a continuous mode of operation wherein the wiper blades operate continuously, and an off mode of operation wherein the wiper blades are operated until they reach a depressed park position at which point they are deactivated.

CROSS REFERENCE TO RELATED APPLICATION

This application is a division of my copending application Ser. No. 414,973 filed on Dec. 1, 1964, now Patent No. 3,351,836, issued Nov. 7, 1967, and entitled Windshield Wiper System With Intermittent Operation.

SUMMARY OF THE INVENTION

The present invention relates to an electronic control circuit for a wiper motor unit having a DC motor with a shunt field winding. A dashboard control switch is provided for selecting either a continuous mode of operation, an intermittent mode of operation with a dwell period at the end of each wiping cycle, or an off mode of operation. In the continuous mode of operation the speed of the motor is infinitely varied by the electronic control which is connected to the shunt field winding to control the current flow through the shunt field winding. The same electronic control is connected to the armature of the motor to control the energization of the wiper motor unit in the intermittent mode of operation.

Accordingly it is an object of the invention to provide a solid state electronic control for a DC motor having a shunt field winding.

It is another object of the invention to provide a control of the type described above which can energize the motor continuously with the speed of the motor controlled by the electronic circuit or intermittently with the length of the dwell periods controlled by the electronic circuit.

Other objects and features of novelty of the present invention will be specifically pointed out or will otherwise become apparent when referring, for a better understanding of the invention, to the following description thaken in conjunction with the accompanying drawing.

BRIEF DESCRIPTION OF THE DRAWING

The figure is a schematic circuit diagram of a control embodying features of the invention for controlling the operation of a wiper motor unit of a windshield cleaning system.

2

DESCRIPTION OF THE PREFERRED EMBODIMENT

Referring to the figure an electronic control circuit is illustrated for controlling the electric motor of a conventional wiper motor unit 10 of the type used on many types of automobiles. Since the wiper motor unit itself is conventional it has not been illustrated in detail. Briefly it includes a speed reducing unit driven by the electric motor. The output shaft 12 of the reducing unit is connected to the windshield wiper blades by suitable linkages (not shown) for oscillating the wiper blades through repeating wiping cycles. The output shaft 12 illustrated schematically in the figure rotates once for every complete wiping cycle whereas the armature 165 of the electric motor rotates at a higher speed depending on the gear reduction involved. In addition to the armature 165 the electric motor of the wiper motor unit 10 has a series field winding 170 and a shunt field winding 172.

The electronic control comprises three transistors 122, 124 and 126 connected together to fuction basically as one transitor having a gain equal to the combined gain of each of the transistors. Specifically, the collectors of the transistors are connected together, the juncture between the base of the transistor 126 and the emitter 124 is connected to ground through a resistor 128 and the juncture between the base of the transistor 124 and the emitter of the transistor 122 is connected to ground through a resistor 127.

Six sets of contacts I, C and O are provided which are adapted to be selectively engaged by movable contact arms 130, 132, 134, 178, 180 and 182. The movable contact arms and six sets of contacts I, C and O physically located in a suitable dashboard mounted switch positioned to enable the driver to simultaneously set the movable contact arms in any one of three positions. In doing so the driver manually selects either an intermittent, continuous or an off mode of operation for the wiper motor unit.

In the positions illustrated in the figure wherein the movable contacts engage the contact I, the wiper motor unit is activated in an intermittent mode of operation wherein the wiper blades are activated in a manner to produce a dwell period at the end of each wiping cycle. When the movable contact arms are moved by the driver to the contact C, the wiper motor unit is operated in a continuous mode of operation wherein the wiper blades are operated continuously without dwell periods. When the movable contact arms are moved by the driver to the contact O, the wiper motor unit is activated in an OFF mode of operation wherein the wiper blades complete the wiping cycle in progress and are deactivated when they reach a depressed park position determined by the switch 176, as will be described in greater detail hereinafter.

The base of the transistor 122 is connected to the movable contact 132 through the series circuit of the variable resistor 80 and the fixed resistor 140. Similarly, the stationary contact I associated with the movable contact 130 is connected to the base of the transistor 122 through the capacitor 74 and the resistor 96.

The movable contact 130 is connected to a movable contact 76 which normally engages a fixed contact 78 connected to the −B potential. The movable contact 76 is cam actuated by the output shaft 12 of the wiper motor unit to engage the stationary contact 82 connected to ground for θ degrees of rotation of the output shaft after which it is tripped back to engage the stationary contact 78. The movable contact 76 engages the stationary contact 82 when the wiper blades are near their turn around point at the end of a complete wiping cycle. This will hereinafter be referred to as the θ region and preferably includes the turn around point. The movable contact 130 is also connected to ground through a washer motor 160 and a washer switch 162 which is manually controlled by the driver. The stationary contacts C and O associated with the movable contact 130 are open circuited.

A second movable contact 92 is also provided which is cam actuated by the output shaft 12 along with the movable contact 76 during the θ region to engage a stationary contact 90 which is connected to the −B potential. The movable contact 92 is connected to the contact I associated with the movable contact 184 through a brake resistor 174, which will be described hereinafter.

The stationary contact O associated with the movable contact 134 is connected directly to ground. The stationary contact C associated with the movable contact 134 is open circuited. The movable contact 134 is connected to the junction between the armature 165 and the series field winding 170 through a normally closed depressed park switch 176, the function of which will be described in greater detail hereinafter. The stationary contact O associated with the movable contact 132 is open circuited, the stationary contact I is connected to −B potential and the stationary contact C is connected to the collectors of the transistors 122–126.

The commonly connected collectors of the transistors 122–126, as well as, the stationary contact C associated with the movable contact 132 are all connected to the stationary contact I associated with the movable contact 178 and to the stationary contact C associated with the movable contact 180. The series field winding 170 connects the movable contact 178 to one side of the armature 165, the other side of which is connected to −B potential. The stationary contact C associated with the movable contact 178 is connected to ground, and the stationary contact O associated with the movable contact 178 is connected to the stationary contact O associated with the movable contact 182. The shunt field 172 connects the movable contacts 180 and 182 together. The stationary contact I associated with the movable contact 180 is connected to ground through a resistor 184 and the stationary contact O associated with the movable contact 180 is connected to −B potential. The stationary contacts I and C associated with the movable contact 182 are also connected to −B potential.

The speed of operation of the wiper motor armature 165 is controlled by the amount of current flowing through the shunt field winding 172. The motor speed is inversely proportional to this field current and, therefore, the greater the current flow through the field winding 172, the slower the motor will operate and vice versa. When the dashboard control knob is turned to the continuous position by the driver, it will be noted that the armature 165 and the series field winding 170 will be connected between −B potential and ground and the shunt field winding 172 will be connected between −B and the collectors of the transistors 122–126. Since the collectors are also connected to the base of the transistor 122 through the variable resistor 80 and the resistor 140, the current through the shunt field winding 172 during the continuous mode of operation will be controlled by the transistors 122–126 in accordance with the value of the resistor 80. Increasing the value of the resistor 80 decreases the base-collector current flow which decreases the emitter-collector flow to the shunt field winding 172 which increases the speed of the motor. Conversely decreasing the value of the resistor 80 increases the current flow to the shunt field winding 172 to decrease the speed of the wiper motor unit.

When the driver wants to turn the wiper blades off he actuates the dashboard mounted switch to the off position which positions each of the six movable contacts on the stationary contacts O associated therewith. This forms a series circuit comprising the series field winding 170 and the shunt field winding 172 connected between the −B potential applied at the stationary contact O associated with the movable contact 180 and ground applied at the stationary contact O associated with the movable contact 134. As a result current will flow through the field windings 172 and 170 in the reverse direction. Also, the armature 165 will be connected between −B potential and ground applied at the stationary contact O associated with the movable contact 134.

Because current flows through the field windings 170 and 172 in the reverse direction, the motor will drive the wiper blades in the reverse direction. The driving mechanism for connecting the wiper motor unit 10 to the wiper blades is arranged so that when the wiper motor is driven in the reverse direction, the wiper blades are moved to a depressed parked position in a conventional manner. Upon reaching the depressed park position the normally closed depressed park switch 176 is opened by a cam (not shown) which functions to open the switch 176 only when the motor 162 is moving in the reverse direction. When the switch 176 opens, power is disconnected from the field windings 170 and 172 and from the armature 165 so that the motor stops and the wiper blades are stopped in the depressed parked position wherein the wiper blades are pressed against the reveal molding at the bottom of the windshield. Since the mechanism for moving the wipers to depressed park and camming the switch 176 open is part of a conventional wiping system used on automobiles today, it has not been illustrated.

When the driver selects the intermittent mode of operation wherein each of the six movable contacts engages the stationary contact I associated therewith, the shunt field winding 172 will be connected in series with the resistor 184 between −B potential and ground so that current flows through the shunt field winding 172 in the forward direction. The armature 165 will be connected in series with the series field winding 170 between −B potential and the collectors of the transistors 122–126. The junction between the armature 165 and the series field winding 170 will be connected through the resistor 174 to the movable contact 92. When the transistors 122–126 are conducting as they will be when the movable contacts 76 and 92 are in the position illustrated, current will flow from −B potential through the armature 165, the field winding 170 and the transistors 122–126 to ground. The wiper motor unit will drive the wipers at a speed determined by the current flowing in the field winding 172 which, in turn, determined by the value of the resistor 184 which is carefully selected to provide the desired wiping speed during intermittent operation.

When the wiper blades enter the θ region near the end of the return stroke of the wiping cycle, the movable contact 92 engages the contact 90 and the contact 76 disengages from the contact 78 and engages the contact 82. As a result, a positive potential is applied at the base of the transistor 122, cutting the transistors 122–126 OFF. At the same time, the resistor 174 is connected across the armature 165, providing electrodynamic braking of the wiper motor. If the electrodynamic braking, together with the mechanical braking of the drag of the wipers on the windshield, is sufficient to stop the motor in less than θ degrees, the wiper blades stop for a dwell period at or near the end of the return stroke.

The length of the dwell period is determined by the length of time it takes for the capacitor 74 to discharge through the resistors 80, 140 and 96 to turn the transistors 122–126 ON again to re-energize the wiper motor and start another wiping cycle. The length of time for this to happen in turn depends on the value of the variable resistor 80. Therefore, the variable resistor preferably is associated with the dashboard switch previously mentioned to enable the driver to select the dwell period he desires, and when in the continuous mode of operation, to select the speed he desires.

It will be observed that when an intermittent wiping cycle is in progress and capacitor 74 is connected to —B potential through the movable contact 76 and the stationary contact 78, the capacitor charges. When the movable contact 76 is tripped to engage the stationary contact 82, the left side of the charged capacitor is connected to ground rather than the —B potential. This jumps the potential on the right side of the capacitor 74 to a positive potential to bias the transistors off until the positive charge is discharged through the resistors 96, 140 and 80.

If the mechanical braking, together with the electrodynamic braking provided by the resistor 174 is insufficient to stop the wiper blades in the $\theta$ region, the contacts 76 and 92 return to the position illustrated and automatically re-energize the motor to initiate the next wiping cycle and skip the dwell period. This in effect automatically places the wiper blades in continuous operation. The point at which the system automatically skips the dwell period can be controlled by adjusting the value of the brake resistor 174 or the value of the resistor 184. The value of the brake resistor 174 determines the amount of the electrodynamic braking as already described, and the value of the resistor 184 controls the speed of the wiper blades. If the value of the resistor 184 is decreased to increase the wiper motor speed, more braking action will be required to stop the wipers in the $\theta$ region of the wiping cycle. Thus a decrease in the value of the resistor 184 will cause automatic skip between continuous and intermittent to take place when the windshield is drier. Similarly, an increase in the value of the resistor 184 will cause the automatic skipping to take place when the windshield is wetter. Preferably, however, the value of the resistor 184 is selected to produce the desired wiper speed and the value of the brake resistor 174 is selected to determine the degree of dryness of the windshield at which the automatic skipping takes place. It is apparent that the automatic skip provides a safety feature when in intermittent operation. If the moisture on the windshield suddenly increases, such as when a truck is passed on a wet road, the wiper blades in effect go into continuous operation automatically until the excess moisture is removed.

If desired the brake resistor 174 can be made variable to enable the automatic switching point to be adjusted to meet the preference of the owner of the vehicle. This also would provide a convenient means for making any future adjustment which might be necessary after a prolonged period of operation. If desired the resistor 184 could also be made variable to provide an adjustment for the speed of the wiper motor during intermittent wiping cycles.

With regard to the energization of the washer motor 160, it will be noted that when the driver manually closes the switch 162 to turn on the washer motor, the operation of the motor 160 will be under control of the movable contact 76 which, in turn, is responsive to the position of the wiper motor unit and is cycled once per wiping cycle. Therefore, the washer motor 160 will not be energized by the closing of the switch 162 if the wiper blades are parked. Further, the pulsing of the wiper motor is synchronized with the position of the wiper blades to squirt the water on the windshield at the optimum position to reduce waste. By utilizing the existing park switch associated with the wiper motor unit, an additional set of contacts does not have to be provided for controlling the washer motor as is the case in many conventional electric washer pumps in use today. An example of this is the electric pump which employs a solenoid for raising a piston (or diaphragm) against a spring biasing force which returns the piston to its starting position when the solenoid is de-energized. Normally a set of contacts is associated with this pump in position to be tripped when the coil fully retracts the piston to de-energize the coil.

Another advantage of controlling the washer motor 160 by the movable contact 76 responsive to the position of the wiper motor unit is that the washer motor 160 is cycled at a frequency which is independent of the viscosity of the liquid cleaner being employed. In the conventional electric pump unit described in the preceding paragraph, the cycle or stroke of the piston will vary with the viscosity of the liquid. The viscosity of the liquid changes significantly during cold weather and may even freeze. Further, it is apparent that this basic construction enables the number of pulses applied to the washer motor 160 per wiping cycle to be varied by simply arranging the movable contact 76 to be tripped any desired number of times per wiping cycle.

While it will be apparent that the embodiment of the invention herein disclosed is well calculated to fulfill the objects of the invention, it will be appreciated that the invention is susceptible to modification, variation and change without departing from the proper scope or fair meaning of the subjoined claims.

What is claimed is:

1. In combination, a source of DC potential, a windshield wiper motor unit for operating wiper blades across a windshield in repeating wiping cycles, the motor of said wiper motor unit being a DC motor having a rotatable armature and a shunt field winding, manually activated switch means having an intermittent position and a continous position, electronic circuit means for controlling current flow to said motor, in said continuous position said manually activated switch means applying said DC potential across said armature and connecting said electronic circuit mean to said shunt field winding and said DC potential, said electronic circuit means including means for varying the flow of current to said shunt field winding to vary the speed of said motor, in said intermittent position said manually activated switch means applying said DC potential across said shunt field winding and connecting said electronic circuit means to said armature whereby the energization of said armature is controlled by said electronic circuit means, and cyclical timing means electrically activated in said intermittent position and responsive to the position of said wiper motor unit for biasing asid electronic circuit means off at the end of each of said wiping cycles for a predetermined dwell period.

2. The invention as defined in claim 1 wherein said electronic circuit means comprises transistor means normally biased ON in said intermittent position and wherein said cyclical timing means comprises capacitive timing means for superimposing a biasing potential on the base circuit of said transistor means to initiate said dwell periods, the length of said dwell period being determined by the length of time required for said capacitive timing means to discharge sufficiently to remove said biasing potential ON.

3. The invention as defined in claim 2 wherein said current varying means comprises a variable resistance connected in the base circuit of said transistor means.

4. The invention as defined in claim 1 wherein said manually activated switch means includes an OFF position wherein said DC potential is applied across said armature in the same direction as in said continuous position and is applied across said shunt field winding in the opposite direction as in said intermittent position to drive said wiper motor unit in a reverse direction, and depressed park switch means responsive to the reverse direction of operation of said wiper motor unit for interrupting power to the motor when said wiper blades reach a predetermined depressed park position.

5. The invention as defined in claim 4 including resistance means connected to said shunt field winding in said intermittent position in a manner to determine the speed of said wiper motor unit during the intermittent mode of operation.

6. The invention as defined in claim 4 wherein said DC motor includes a series field winding connected in series with said armature and said electronic circuit means in said intermittent position, and connected in series with said armature and said DC potential in said continuous position, and connected in series with said shunt field winding in said OFF position.

References Cited

UNITED STATES PATENTS 2,977,623 4/1961 Schmitz ---------- 15—250.12
3,351,836 11/1967 Kearns ------------ 318—443

ORIS L. RADER, Primary Examiner

R. J. HICKEY, Assistant Examiner

U.S. Cl. X.R.

318—443